(12) United States Patent
Amineh

(10) Patent No.: US 7,397,413 B2
(45) Date of Patent: Jul. 8, 2008

(54) COMMUNICATION UNIT PROVIDED WITH INTRA-CHANGEABLE ELEMENTS

(75) Inventor: Romel Amineh, Umeae (SE)

(73) Assignee: Nokia Corporation, Espoo (FI)

( * ) Notice: Subject to any disclaimer, the term of this patent is extended or adjusted under 35 U.S.C. 154(b) by 651 days.

(21) Appl. No.: 10/004,815

(22) Filed: Dec. 7, 2001

(65) Prior Publication Data

US 2002/0094755 A1     Jul. 18, 2002

(30) Foreign Application Priority Data

Dec. 21, 2000 (GB) .................................. 0031373.4

(51) Int. Cl.
  *G08C 17/00* (2006.01)
(52) U.S. Cl. ........................ 341/176; 379/368; 455/566
(58) Field of Classification Search ................ 341/176, 341/27, 22, 34; 455/566, 567; 379/368
  See application file for complete search history.

(56) References Cited

U.S. PATENT DOCUMENTS

| | | | | |
|---|---|---|---|---|
| 4,004,450 A | | 1/1977 | Yakshin et al. .................. 73/12 |
| 4,815,729 A | | 3/1989 | Stefanski ...................... 272/67 |
| 5,241,308 A | | 8/1993 | Young .......................... 341/34 |
| 5,283,401 A | * | 2/1994 | Schmucker .................. 200/6 A |
| 5,311,175 A | | 5/1994 | Waldman | |
| 5,348,510 A | | 9/1994 | DuPont et al. .............. 446/100 |
| 5,357,062 A | | 10/1994 | Rockwell et al. .............. 178/18 |
| 5,367,133 A | | 11/1994 | Schmidt et al. ............. 200/5 A |
| 5,526,701 A | | 6/1996 | Tamori .................. 73/862.046 |
| 5,805,664 A | | 9/1998 | Whipple, III et al. ........ 378/117 |
| 5,818,361 A | * | 10/1998 | Acevedo ...................... 341/23 |
| 5,835,388 A | * | 11/1998 | Helm ......................... 708/111 |
| 5,926,119 A | | 7/1999 | Lindeman et al. | |
| 5,931,764 A | * | 8/1999 | Freeman et al. ................ 482/4 |
| 5,946,636 A | | 8/1999 | Uyeno et al. | |
| 5,982,304 A | | 11/1999 | Selker et al. | |
| 5,987,317 A | * | 11/1999 | Venturini ................. 455/412.2 |
| 6,032,053 A | * | 2/2000 | Schroeder et al. ......... 455/553.1 |
| 6,608,996 B1 | * | 8/2003 | Laurikka et al. ........... 455/90.3 |

(Continued)

FOREIGN PATENT DOCUMENTS

EP           0 872 996        10/1998

(Continued)

OTHER PUBLICATIONS

An Official Action Issued by the European Patent Office Jan. 31, 2007.

(Continued)

*Primary Examiner*—Brian Zimmerman
*Assistant Examiner*—Hung Q Dang
(74) *Attorney, Agent, or Firm*—Alston & Bird LLP

(57) ABSTRACT

In communication units the input and/or output of data is normally performed using keypad input, voice input/output or display output. This limits the input/output of the communication unit. The claimed invention proposes a new way of inputting/outputting of data by providing a communication unit with intra-changeable elements, where the physical properties of the elements are changed by an electrical or a mechanical signal/input and that the elements are used in the user interface of the communication unit to enable flexible input and output of data from the communication unit. The user input and output is thereby including a sensory indication, including a physical and/or visual dimension.

18 Claims, 3 Drawing Sheets

U.S. PATENT DOCUMENTS 6,700,508 B1 * 3/2004 Nomura et al. ................ 341/27
6,788,294 B2 * 9/2004 Takala et al. ................ 345/173

FOREIGN PATENT DOCUMENTS

| | | |
|---|---|---|
| EP | 0872996 | 10/1998 |
| GB | 2311888 | 10/1997 |
| GB | 2 333 392 | 7/1999 |
| GB | 2333392 | 7/1999 |
| GB | 2 355 126 A | 4/2001 |
| JP | 55-29879 | 3/1980 |
| JP | 58 154962 | 9/1983 |
| JP | 61 181296 | 8/1986 |
| JP | 64 51793 | 2/1989 |
| JP | 6 43803 | 2/1994 |
| JP | 8 220988 | 8/1996 |
| JP | 9 106319 | 4/1997 |
| JP | 10 093675 | 4/1998 |
| JP | 1093675 | 4/1998 |
| JP | 10 136067 | 5/1998 |
| JP | 10 255106 | 9/1998 |
| JP | 11136319 | 5/1999 |
| JP | 11 331407 | 11/1999 |
| JP | 2000 244615 | 9/2000 |
| JP | 2000 267556 | 9/2000 |
| JP | 2001 109710 | 4/2001 |
| WO | 0028717 | 5/2000 |
| WO | WO 00/28717 | 5/2000 |
| WO | 0052665 | 9/2000 |
| WO | 0068917 | 11/2000 |
| WO | WO 00/68917 | 11/2000 |
| WO | 0109863 | 2/2001 |

OTHER PUBLICATIONS

A Notice of Rejection Reasons Issued by the Japanese Patent Office Dec. 26, 2006.
A Notice of Rejection Reasons Issued by the Japanese Patent Office Dec. 26, 2006.
European Search Report.

* cited by examiner

COMMUNICATION UNIT PROVIDED WITH INTRA-CHANGEABLE ELEMENTS

BACKGROUND OF THE INVENTION

1. Field of the Invention

The invention relates to a communication unit provided with intra-changeable elements. The intra-changeable elements are used as an input and/or an output device for the communication unit.

2. Description of Prior Art

In communication units, or mobile phones as they can also be called, there is often a need for an improved or easier way to input data. Especially since mobile phones are provided with several input methods and it is not always obvious to the user which options are available for each application in the mobile phone. In most mobiles phones the different available options are displayed in the bottom of the display and different soft-keys of the phone are used to select the options. However many of the latest phones are provided with options that not are displayed on the display. This forces the user to remember hidden options for each application or to be irritated when he/she has selected the wrong option and needs to turn back for another selection.

The normally used input device also limits the user options of a more personalized input. In present mobile phones, the available features for the user are voice, text messaging (SMS) and picture messaging. Vibrations can also be used as incoming message alert if the receiver has set his/her phone to that option, but that is more of an alerting option than a way of communication. As described there are not any options for transfer of a more physical message, like a hug or a squeeze of a hand etc.

The purpose with this invention is to provide a mobile phone having an input device that overcomes the drawbacks of the present mobile phones for indicating the available input options and how to create a new type of input.

The claimed invention provides a communication unit with an input device enabling the user to sense different available input options. Its also provides a communication unit with an input device for input of a new more personalized message, where the same input device can also be used as output device for the same type of messages.

SUMMARY OF THE INVENTION

The invention provides a communication unit with an input device that enables the user to sense the different available input options.

According to a first preferred embodiment of the claimed invention a communication unit is provided with intra-changeable elements, where the physical properties of the elements may be changed by an electrical or a mechanical signal/input and that the elements are used in the user interface of the communication unit to enable flexible input and output of data from the communication unit.

The invention also provides a communication unit with an input device that enables the user to input a physical or sensory message.

According to a second preferred embodiment of the claimed invention a communication unit is provided with intra-changeable elements, where the physical properties of the intra-changeable elements are changed by an electrical or a mechanical signal/input, and that the intra-changeable elements are used in the user interface of the communication unit to enable flexible input and output of data from the communication unit.

The invention is also a method for transferring a physical message from one communication unit to another communication unit.

A third preferred embodiment of the invention is a method for transferring an input from a first communication unit to a second communication unit, and displaying the input as output in the second communication unit in the following manner: compressing an input device including intra-changeable elements on a first communication unit, transforming the input from the intra-changeable elements of the input device to electrical signals, transferring the electrical signals with the first communication unit to a second communication unit, re-transforming the electrical signals in the second communication unit to output signals and, and finally transferring the output signals to the intra-changeable elements of the second communication unit and expanding the intra-changeable elements according to the output signals.

BRIEF DESCRIPTION OF THE DRAWINGS

The invention will be explained more fully below, by way of example, in connection with preferred embodiments and with reference to the drawing, in which.

DETAILED DESCRIPTION OF THE INVENTION

Figure 1:
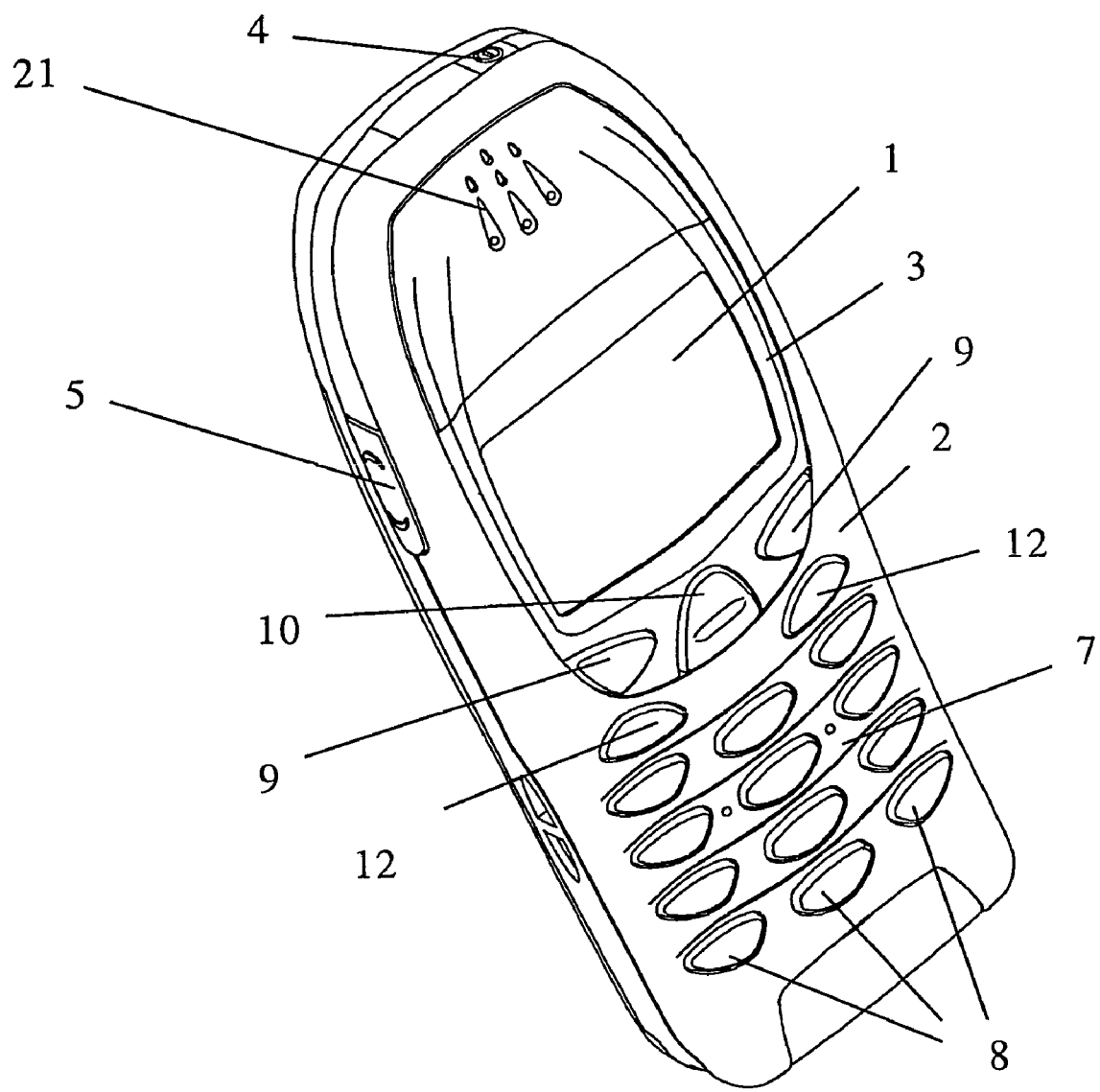
FIG. 1 shows in a perspective view a known embodiment of a communication unit.

A communication unit provided with intra-changeable elements according to invention is described with reference to a hand portable phone, preferably a cellular/mobile phone. An embodiment of this phone is shown in FIG. 1, where a cellular/mobile phone is shown in perspective. As will be seen, the phone is provided with a front cover 2 having a window frame 3 encircling the protection window of the display assembly 1. The cellular/mobile phone comprises a user interface having an on/off button 4, a keypad 7, a battery 14 (not shown), a display/LCD 1, an earpiece 21 and a microphone 22 (not shown).

The keypad 7 has a first group of keys 8 as alphanumeric keys, by means of which the user can enter a telephone number, write a text message (SMS), write a name (associated with the phone number), etc. Each of the twelve alphanumeric keys 8 is provided with a figure "0-9" or a sign "#" or "*", respectively. In alpha mode each key is associated with a number of letters and special signs used in the text editing.

The keypad 7 additionally comprises two menu selection keys 9, two call handling keys 12, and a navigation key 10. The functionality of the soft key depends on the state of the phone and the navigation in the menu by using a navigation key. The present functionality of the menu selection keys 9 is shown in separate fields in the display 1 just above the keys 9. The two call handling keys 12 are used for establishing a call or a conference call, terminating a call or rejecting an incoming call.

The navigation key 10 is an up/down key and is placed centrally on the front surface of the phone between the display 1 and the group of alphanumeric keys 8. Hereby the user will be able to control this key with a thumb. This is the best site to place an input key requiring precise motor movements. Many experienced phone users are used to one-hand handling. They place the phone in the hand between the fingertips and the palm of the hand. Hereby the thumb is free for inputting information.

Figure 2:
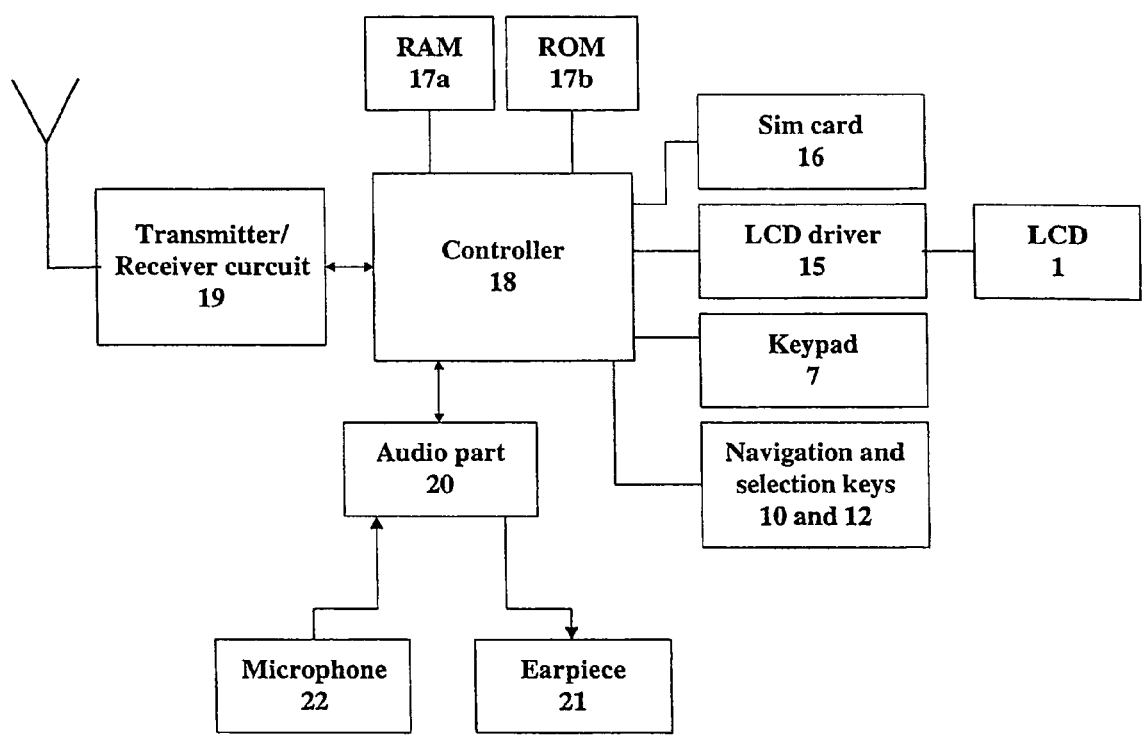
FIG. 2 schematically shows the essential parts of a telephone for communication with a cellular network.

FIG. 2 schematically shows the most important parts of a preferred embodiment of the phone/terminal, said parts being essential to the understanding of the invention. The microphone 22 records the user's speech, and the analogue signals formed thereby are A/D converted in an A/D converter (not shown) before the speech is encoded in an audio part 20. The encoded speech signal is transferred to the controller 18 (physical layer processor), which e.g. supports GSM terminal software. The controller 18 also forms the interface to the peripheral units of the apparatus, including RAM and ROM memories 17a and 17b, a SIM card 16, the display 1 and the keypad 7 (from FIG. 1) as well as data, power supply, etc. The controller 18 communicates with the transmitter/receiver circuit 19. The audio part 20 speech-decodes the signal, which is transferred from the controller 18 to the earpiece 21 via a D/A converter (not shown).

The preferred embodiment of the phone of the invention is adapted for use in connection with a GSM network, but, of course, the invention may also be applied in connection with other phone networks. It could be cellular networks, various forms of cordless phone systems or in dual band phones accessing sets of these systems/networks.

The controller 18 is connected to the user interface of the mobile phone. Thus, it is the controller 18, which monitors the activity in the phone and controls the display 1 in response thereto.

Therefore, it is the controller 18, which detects the occurrence of a state change event and changes the state of the phone and thus the display text. The user may cause a state change event, when he/she activates the keypad 7 including the menu selection key or keys 9, and these type of events are called entry events or user events. However, the network communicating with the phone may also cause a state change event. These type of events and other events beyond the user's control are called non-user events. Non user events comprise status change during call set-up, change in battery voltage, change in antenna conditions, message on reception of SMS, etc.

Figure 3:
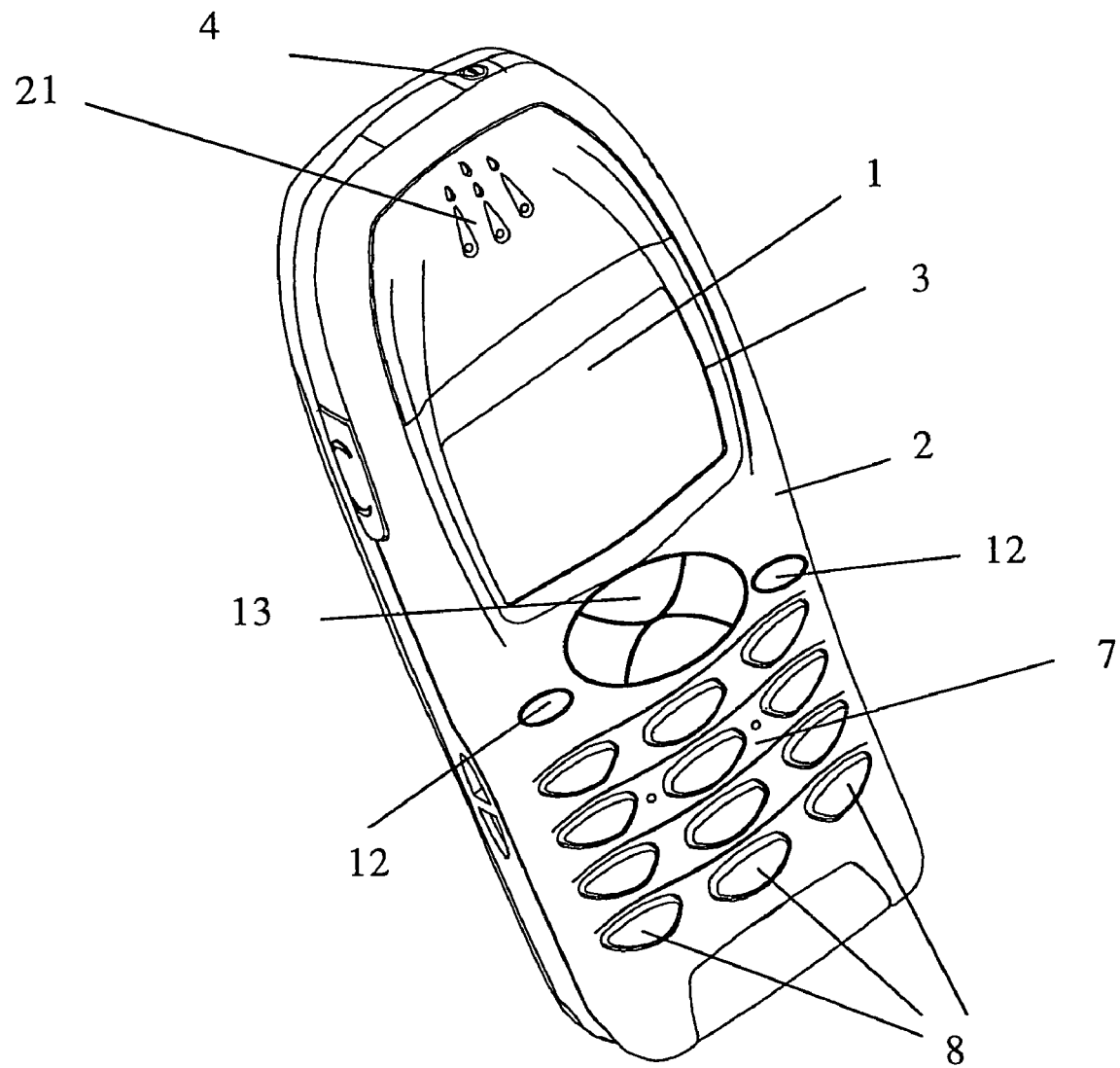
FIG. 3 shows in a perspective view preferred embodiments of the communication unit having a four-way-scroller.

Different embodiments of the invention will be described with reference to FIG. 3 showing the communication unit provided with intra-changeable elements.

According to a first preferred embodiment of the claimed invention a communication unit provided with intra-changeable elements, where the physical properties of the elements are changed by an electrical or a mechanical signal/input and that the elements are used in the user interface of the communication unit to enable improved input.

As shown in FIG. 3 a communication unit is provided with a four-way-scroller, where the scroller is normally used for navigation in the menus of the communication unit. Compared with the communication unit shown in FIG. 1 the menu selection keys 9 and the navigation key 10 have been replaced by the four-way-scroller 13.

The functionality of the different parts of the scroller 13 depends on the menus and the present status of the communication unit. The functionality options in each menu is shown in the display 1 with small labels indicating the functionality options. There are however only two options displayed in the display 1 since most communication units are only provided with two soft-keys 9 to navigate in the menus although there are more options. This naturally could easily be solved by having more functionality options displayed in the display 1. Another possibility is to have the surface of the four-way-scroller 13 to indicate the different functionality options. In FIG. 3 is shown that the four-way-scroller 13 includes four separate surface parts. By having these parts having different levels, the level difference could indicate which parts of the scroller surface that present the available options in that menu. The surface parts representing available options could be levelled in relation to those not representing an available option. For example if only two functionality options are available and are represented by the left and the right surface part of the scroller 13, then those two surface parts are levelled in relation to the up and down parts of the scroller 13.

This could be of great support for a user having a visual handicap that can easily find which functionality options are available. In the above description it has been shown how levelled surfaces can be used in a four-way-scroller 13, but it is clear that this could also be used for the other keys on the keypad 7 if they are supposed to represent a certain option, e.g. in game applications where typically a number of the keys on the keypad are dedicated to certain options like: move right, left, up or down, single shot, multiple etc.

To enable the surfaces of the four-way-scroller 13 to change level or to provide sensory indications, they have been made by using intra-changeable elements like piezo-electrical elements. The intra-changeable elements could also be made in elasto-resistive materials with electrodes incorporated. These materials are well known to be able to change their physical characteristics when being affected by an electrical input.

According to a second preferred embodiment of the claimed invention a communication unit provided with intra-changeable elements, where the physical properties of the intra-changeable elements are changed by an electrical or a mechanical signal/input, and that the intra-changeable elements are used in the user interface of the communication unit to enable flexible input and output of data from the communication unit.

In the first embodiment of the invention the intra-changeable elements are used to provide a sensory indication of the available functionality options of the communication unit. In the second preferred embodiment of the claimed invention the intra-changeable elements have no predefined input or output surface, but are merely available for the user to define his/her own physical input.

This means that the communication unit is provided with intra-changeable elements that receive their input from the user pressing or touching the intra-changeable elements. The pattern of the user's input will be interpreted into electrical signals that are transformed into digital signals. These digital signals can be transferred to another communication unit having the same or compatible intra-changeable elements, where the digital signals are transformed into electrical signals and changing the intra-changeable elements so that the input pattern of the first communication unit becomes the output pattern of the second communication unit. This transfer of a "physical" input between communication units should be possible during a call. It can be transferred using User-To-User signalling (USS) or any other way of signal transfer during calls. It should also be possible to send the signal as an SMS with a header indicating that a "physical" message is coming.

In one embodiment of the intra-changeable elements, the said element could be a matrix of electrodes or pixels, where each affected pixel can be located. The relative force or pressure that has been applied on each pixel is also measured. The location of the pressed or affected pixel and the relative pressure or force is transferred to the receiving communication unit by any other earlier mentioned ways of transferring.

Changes of the intra-changeable elements are preferably transmitted and updated whenever a change takes place. This means that signals with update of change information are transferred when a change takes place.

The intra-changeable elements should be possible to apply on communication units having exchangeable as well as fixed covers. The covers are provided with an interface that enables the signals to be transferred from the cover to the processor of the communication unit. The interface could be any form of connecting device suitable for transferring the signals.

The intrachangeable elements may also be provided on a unit external to the communication device. For example, the intrachangeable elements may be provided as a plug-in accessory for a communication device.

The intra-changeable elements could as earlier stated be of piezo-electrical elements or elasto-resistive materials. They can be placed on any part of the communication unit that enables the user to affect the intra-changeable elements in a preferred way.

Piezo-electrical elements and their properties are well known and prior art describes these elements per se. Elasto-resistive material is known from U.S. Pat. No. 5,805,664, disclosing an imager control system with contact detection capability, where the contact detection includes sensor elements. Each sensor element comprises a plurality of elasto-meric electrodes. Elastomeric refers in this document to electrodes that are capable of some degree of physical deformation, where the deformation results in a change in the electrical resistance of the electrode.

The term intra-changeable element includes elements in which their physical characteristics (for example, form, position, color, size etc) may be changed, for example, as a result of a mechanical or electrical signal. An intra-changeable element may also generate a mechanical or electrical signal in response to a physical deformation or force being applied thereto.

The invention is not limited to the above-described examples or to the drawings showing examples of an embodiment, but can be varied within the scope of the appended claims.

What is claimed is:

1. A communication unit including a display, a user interface separate from the display and a digital control with associated random access and read only memory for control of said communication unit, including intra-changeable elements controlled by said digital control, said intra-changeable elements being defined by having a physical characteristic that is changeable responsive to said digital control, wherein said intra-changeable elements are configured to provide an output responsive to messages generated external to the communication unit and received at said communication unit, wherein said intra-changeable elements are used in the user interface of said communication unit, and wherein said intra-changeable elements are compressible and expandable.

2. A communication unit provided with intra-changeable elements according to claim 1 wherein said intra-changeable elements are piezo-electrical elements.

3. A communication unit provided with intra-changeable elements according to claim 1 wherein said intra-changeable elements are made of elasto-resistive materials.

4. A communication unit provided with intra-changeable elements according to claim 1 wherein said intra-changeable elements are included in both an input and an output device of said communication unit, and said processor modulates said intra-changeable elements wherein said input and output device is a cover part of the communication unit.

5. A method for inputting of data to a communication unit provided with a display, a user interface separate from the display and comprising a keypad wherein individual keys of said keypad are changeable to provide a sensory indication of the keys available to make the communication unit perform an action by pressing said changeable keys, and that change of individual keys is performed by having intra-changeable elements in said individual keys, wherein the method comprises providing an output via the intra-changeable elements responsive to messages generated external to the communication unit and received at said communication unit, and wherein the intra-changeable elements are piezo-electrical elements.

6. A method for transferring an input from a first communication unit to a second communication unit, and displaying said input as output in said second communication unit, where operation of said first communication unit includes the following steps:
   compressing an input device including intra-changeable elements on a first communication unit;
   transforming the input from said intra-changeable elements of said input device to electrical signals;
   transferring said electrical signals from said first communication unit to a second communication unit;
and wherein said second communication unit includes the following steps:
   receiving said electrical signals from said first communication unit at said second communication unit;
   retransforming said electrical signals in said second communication unit to output signals to intra-changeable elements of said second communication unit and;
   transferring said output signals to said intra-changeable elements of said second communication unit and expanding said intra-changeable elements according to said output signals.

7. A communication device having a user interface for inputting data to the device, the device comprising:
   a display separate from the user interface;
   a receiver for receiving a control signal; and
   a changeable element, responsive to the received signal, to change physical characteristics of the element, wherein the changeable element forms part of the user interface and wherein the changeable element responds to the control signal to indicate an availability of the element for inputting data to the device,
   wherein the changeable element is configured to provide an output responsive to messages generated external to the communication device and received at the communication device, and wherein the changeable element is made of elasto-resistive materials.

8. A communication device of claim 7, wherein changeable characteristics of the changeable element are controlled by a digital controller with associated random access and read only memories and include at least one of form, color, height, shape, area, volume, temperature and position.

9. A communication device having a user interface, the device comprising:
   a display separate from the user interface;
   a receiver for receiving a control signal; and
   a changeable element controlled by a digital controller with associated random access and read only memories and responsive to the received signal to change physical characteristics of the element, wherein the changeable element forms part of the user interface and wherein the changeable element changes physical characteristics in response to the control signal thereby providing a sensory message to a user, and wherein the changeable element is configured to provide an output responsive to messages generated external to the communication device and received at the communication device, wherein the changeable element is included in both an input and an output device of the communication device, and the digital controller modulates the changeable element, wherein said input and output device is a cover part of the communication device.

10. A communication device of claim 9, wherein changeable characteristics of the changeable element include at least one of form, color, height, shape, area, volume, temperature and position.

11. A communication device having a user interface, the device comprising:
  a display separate from the user interface;
  a receiver for receiving a control signal; and
  a changeable element controlled by a digital controller with associated random access and read only memories and responsive to the received signal to change characteristics of the element, wherein the changeable element forms part of the user interface and wherein the changeable element changes characteristics in response to the control signal thereby providing a sensory message to a user; and wherein
  the changeable element generates control signals in response to a change in characteristics and wherein the communication device further comprises a transmitter for transmitting control signals generated by the changeable element in response to a physical deformation, and wherein the changeable element is configured to provide an output responsive to messages generated external to the communication device and received at the communication device, and wherein said changeable element is compressible and expandable.

12. A communication unit including a display, a input device separate from the display, and a digital control with associated random access and read only memory for control of said communication unit, including intra-changeable elements being defined by having a physical characteristic that is changeable responsive to control by said digital control, and where said elements are used in the user interface of said communication unit; and wherein said intra-changeable elements are included in an input device of said communication unit, and said digital controller modulates said intra-changeable elements to provide a sensory indication of options of said input device, and
  wherein said intra-changeable elements are configured to provide an output responsive to messages generated external to the communication unit and received at said communication unit, and wherein said intra-changeable elements are piezo-electrical elements.

13. A communication unit including a display, a input device separate from the display, and a digital control with associated random access and read only memory for control of said communication unit, including intra-changeable elements being defined by having a physical characteristic that is changeable responsive to control by said digital control, and where said elements are used in the user interface of said communication unit; and wherein said intra-changeable elements are included in an input device of said communication unit, and said digital controller modulates said intra-changeable elements to provide a sensory indication of options of said input device wherein said input device includes at least one of said intra-changeable elements, and
  wherein said intra-changeable elements are configured to provide an output responsive to messages generated external to the communication unit and received at said communication unit, and wherein said intra-changeable elements are made of elasto-resistive materials.

14. A communication unit including a display, a user interface separate from the display, and a digital control with associated random access and read only memory for control of said communication unit, including intra-changeable elements being defined by having a physical characteristic that is changeable responsive to control by said digital control, and where said elements are used in the user interface of said communication unit; and wherein said intra-changeable elements are included in both an input and an output device of said communication unit, and said digital controller modulates said intra-changeable elements, and
  wherein said intra-changeable elements are configured to provide an output responsive to messages generated external to the communication unit and received at said communication unit, wherein said digital controller modulates said intra-changeable elements, wherein said input and output device is a cover part of the communication unit.

15. A communication unit including a display, an input device, an output device, and a digital control with associated random access and read only memory for control of said communication unit, including intra-changeable elements being defined by having a physical characteristic that is changeable responsive to control by said digital control, and wherein said intra-changeable elements are included in both the input and the output device of said communication unit, and said digital controller modulates said intra-changeable elements so that said input and output device includes at least one of said intra-changeable elements, and
  wherein said intra-changeable elements are configured to provide an output responsive to messages generated external to the communication unit and received at said communication unit, and wherein said intra-changeable elements are compressible and expandable.

16. A communication unit including a display, a user interface separate from the display, and a digital control with associated random access and read only memory for control of said communication unit, including intra-changeable elements being defined by having a physical characteristic that is changeable responsive to control by said digital control, and where said elements are used in the user interface of said communication unit; and wherein said intra-changeable elements are included in an input device of said communication unit, and that said digital control modulates said intra-changeable elements to provide a sensory indication of options of said input device wherein said input device is a four-way-scroller, and
  wherein said intra-changeable elements are configured to provide an output responsive to messages generated external to the communication unit and received at said communication unit, and wherein said intra-changeable elements are piezo-electrical elements.

17. A communication unit including a display, a user interface separate from the display, and a digital control with associated random access and read only memory for control of said communication unit, including intra-changeable elements being defined by having a physical characteristic that is changeable responsive to control by said digital control, and where said elements are used in the user interface of said communication unit; and wherein said intra-changeable elements are included in an input device of said communication unit, and said processor modulates said intra-changeable elements to provide a sensory indication of options of said input device wherein said input device is a cover part of the communication unit, and wherein said intra-changeable elements are configured to provide an output responsive to messages generated external to the communication unit and received at said communication unit, and wherein said intra-changeable elements are made of elasto-resistive materials.

18. A communication device including a user interface, the device comprising:

a display separate from the user interface, and a receiver for receiving a control signal; and a changeable element controlled by a digital controller with associated random access and read only memories and responsive to the received signal to change characteristics of the element, wherein the changeable element forms part of the user interface and wherein the changeable element changes characteristics in response to the control signal thereby providing a sensory message to a user; and wherein the changeable element generates control signals in response to a change in characteristics, and wherein the changeable element is configured to provide an output responsive to messages generated external to the communication device and received at the communication device, wherein the changeable element is included in both an input and an output device of the communication device, and the digital controller modulates the changeable element, wherein said input and output device is a cover part of the communication device.

* * * * *